US008180831B2

(12) United States Patent
Striemer

(10) Patent No.: US 8,180,831 B2
(45) Date of Patent: May 15, 2012

(54) AD-HOC MEDIA DELIVERY SYSTEM

(75) Inventor: Bryan Lester Striemer, Zumbrota, MN (US)

(73) Assignee: International Business Machines Company, Armonk, NY (US)

( * ) Notice: Subject to any disclaimer, the term of this patent is extended or adjusted under 35 U.S.C. 154(b) by 3009 days.

(21) Appl. No.: 10/324,793

(22) Filed: Dec. 18, 2002

(65) Prior Publication Data
US 2004/0123321 A1    Jun. 24, 2004

(51) Int. Cl.
| G06F 15/16 | (2006.01) |
| G06F 15/173 | (2006.01) |
| G06Q 20/00 | (2012.01) |
| G09G 5/00 | (2006.01) |
| H04M 3/42 | (2006.01) |
| H04M 3/00 | (2006.01) |
| H04N 7/16 | (2011.01) |

(52) U.S. Cl. .......... 709/205; 709/225; 705/67; 345/156; 455/414.1; 455/418; 725/62; 725/147; 725/148

(58) Field of Classification Search .................. 709/205, 709/225; 705/67; 345/156; 455/414.1, 418; 725/62, 147, 148
See application file for complete search history.

(56) References Cited

U.S. PATENT DOCUMENTS
| 4,974,252 A * | 11/1990 | Osborne ..................... 379/92.01 |
| 2001/0047401 A1* | 11/2001 | McTernan et al. ............. 709/219 |
| 2002/0022453 A1 | 2/2002 | Balog et al. |
| 2002/0045438 A1* | 4/2002 | Tagawa et al. ................. 455/412 |
| 2002/0059621 A1* | 5/2002 | Thomas et al. .................. 725/87 |
| 2002/0133545 A1 | 9/2002 | Fano et al. |
| 2002/0164987 A1 | 11/2002 | Caronni et al. |
| 2002/0191576 A1* | 12/2002 | Inoue et al. .................... 370/338 |
| 2004/0085985 A1* | 5/2004 | Lebizay et al. ................ 370/419 |
| 2004/0203729 A1* | 10/2004 | Makipaa et al. ............ 455/426.1 |

FOREIGN PATENT DOCUMENTS
| JP | 2002199056 A1 | 7/2002 |
| WO | WO 02/07135 A1 | 1/2002 |

OTHER PUBLICATIONS

Doyle et al., "Mobile Context-Aware Stories," Trinity College Dublin, Ireland, Aug. 26, 2002.

* cited by examiner

*Primary Examiner* — Alina N Boutah
*Assistant Examiner* — Clarence John
(74) *Attorney, Agent, or Firm* — Steven W. Roth; Roy W. Truelson

(57) ABSTRACT

Disclosed is an apparatus, method, and program product for performing ad hoc media delivery. Enhanced handheld devices are used in combination with the other components to route media and control its presentation. Enhanced media presentation stations detect the presence of one or more of the handheld devices. Information regarding the presence of a handheld device is then communicated from the media presentation stations to an enhanced server. The server uses this information to maintain a record of the location of each handheld device. The recorded location information is used to route the media to the media presentation station that is closest to the location of the handheld device. Control information, such as media selection and fidelity control (when appropriate), is forwarded from the handheld device to the server, so that the server can take appropriate action relative to transmission of the media to the media presentation station at issue. If a phone call is received, an enhanced phone interacts with the server to suspend presentation of the media until the phone call has ended.

36 Claims, 14 Drawing Sheets

AD-HOC MEDIA DELIVERY SYSTEM

FIELD OF THE INVENTION

The present invention relates to media presentation stations, and in particular, to the problems associated with user location vis-à-vis media presentation stations.

BACKGROUND OF THE INVENTION

Media systems are a well-known part of today's society. In fact, most people have at least one media system (e.g., audio system, video system, etc.) in their home or apartment. Restaurants, nightclubs, institutions (e.g., hospitals), and other larger facilities have even more comprehensive systems that can be used to play music, video, and/or broadcast messages.

Despite this widespread use, today's media systems do not adapt well to positional changes of the user. In fact, quite the opposite is true. The user is forced to go to the location where the media is being presented instead of the other way around. For example, if a user wants to listen to music, he or she must either go to a specified location where the music can be heard or predefine a new location (i.e., speaker location) where he or she would like the music to be heard. The same can be said for video, if the user wants to watch a particular video item, he or she must go to a specific location, typically the location of the video monitor, and select the video item. Now, it is true that present day media distribution systems do permit the user to predefine more than one location, which makes it possible to move between locations without significant interruption. However, even this flexibility is not without clear drawbacks. First, the user must still predefine where he or she wishes to receive the media, and second, the user can only be in one location at a time, meaning that the media is being distributed to a location where it is potentially unneeded, or worse, unwanted.

The inflexibility and inefficiencies of today's media distribution systems will persist without a mechanism to distribute media in a way that does not require users to follow the media from location to location.

SUMMARY OF THE INVENTION

The present invention involves an apparatus, method, and program product that are each drawn to an enhanced media distribution system (MDS). The enhanced MDS of the present invention permits the user to move from a first location to a second location with an associated media transmission change, without having to predefine the second location.

The preferred embodiment of the present invention provides the above-mentioned function through the use of a wireless handheld device. When the user moves the handheld device from one location to another, the DMS of the preferred embodiment notes the new location of the handheld device and adapts by redirecting transmission of the media to the new location. Another feature of the present invention, as taught by the preferred embodiment, is automatic suspension/resumption of media presentation for phone call handling. If a phone call is received, the enhanced phone of the preferred embodiment interacts with other components to suspend presentation of the media until the phone call has ended.

DESCRIPTION OF THE PREFERRED EMBODIMENT

Turning now to the drawings, Media Distribution System (MDS) 100 of the preferred embodiment is shown to contain several different components. These include: Server 102, Phone 130, Headset 135, Handheld 125, and Media Presentation Systems (MPS) I through IV (also respectively denoted as 105-120). The arrows interconnecting these components are in place to show one or two way interaction. This interaction is facilitated by wireless connectivity. The wireless protocol used in the preferred embodiment is that known in the industry as Bluetooth, although other wireless protocols could be used. For more information on Bluetooth, the reader is referred to the Bluetooth specification, which is developed, published and promoted by the Bluetooth Special Interest Group.

Server 102 of the preferred embodiment is an IBM Server that has been enhanced to provide the function needed by the preferred embodiment. More information regarding these enhancements is provided in the ensuing discussion, and particularly in the text associated with FIGS. 4 and 8A through 8D. Handheld device 125 of the preferred embodiment is an hp IPAQ Pocket PC h5450 that has been enhanced to provide the function needed within the preferred embodiment. These enhancements are described in more detail in the ensuing paragraphs, and particularly in the discussion associated with FIGS. 3, 6A, and 6B. Phone 130 of the preferred embodiment is an Ericsson R520m that has been enhanced to provide the function needed within the preferred embodiment. Headset 135 of the preferred embodiment is an Ericsson HBH-30 Bluetooth headset.

Figure 1:
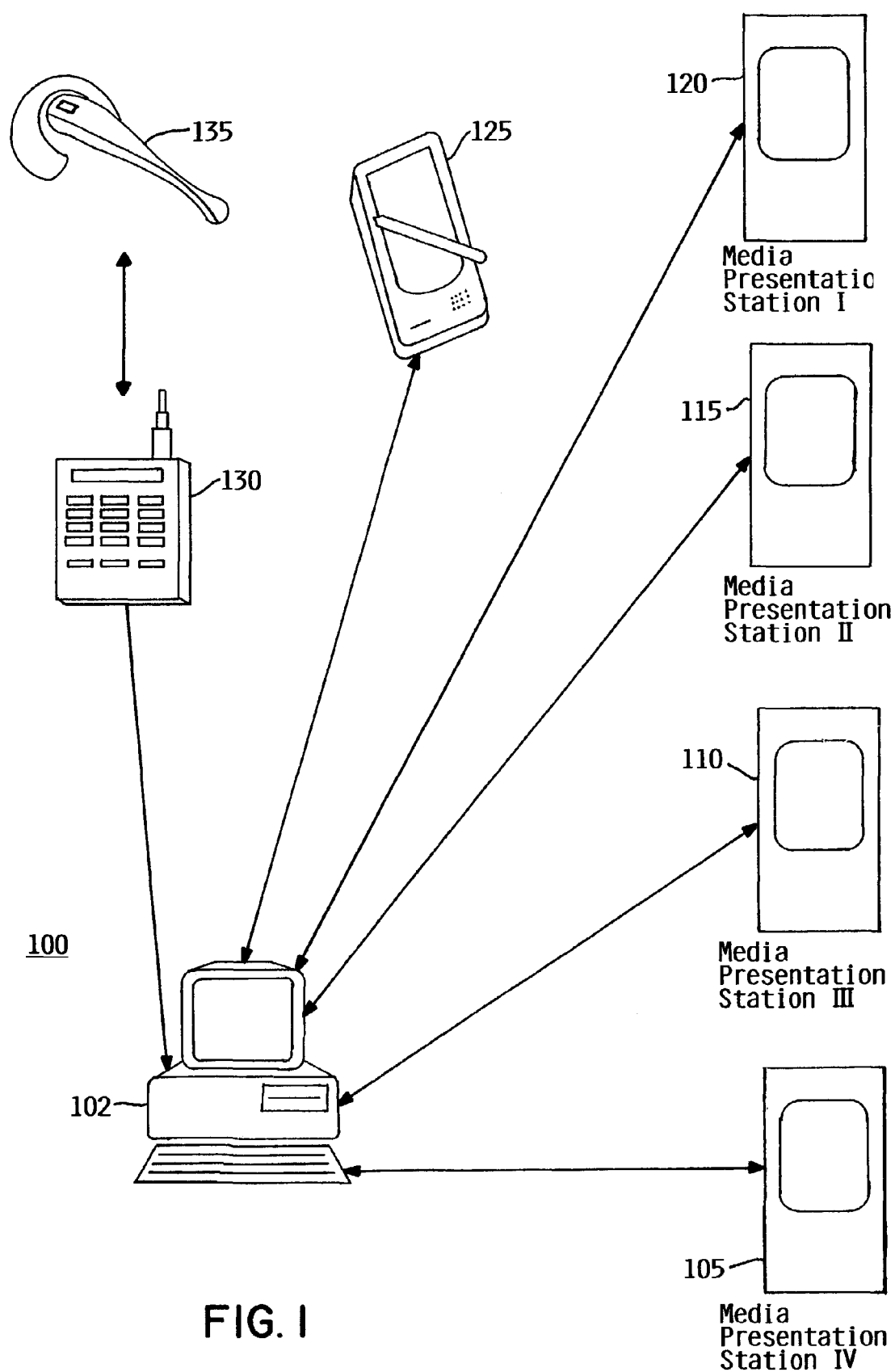
FIG. 1 is an interaction diagram showing typical components that could be used in the Media Distribution System of the preferred embodiment of the present invention.

It should be noted here that while specific devices have been selected for use in the preferred embodiment, other makes and/or models of devices could be used if similarly enhanced. It should also be noted that other configurations of the components shown in FIG. 1 are also possible, and that not all of depicted components need necessarily be present. For instance, MDS 100 can perform many of its functions without the presence of phone 130 and Headset 135. It would also be possible to incorporate the functions of phone 130 into HD 125, and it is also conceivable that the functions of phone 130 and HD 125 could be incorporated into Headset 135. Thus, the term handheld device is used herein to refer to small scale devices like phones, PDAs, and remote controls that be fairly easily transported by a user. It should also be noted that while a specific number of components are shown in the description of the preferred embodiment, additional handheld devices, phones, media presentation stations, and servers could also be accommodated.

As to the Media Presentation Stations of the preferred embodiment, it will be understood by those skilled in the art that the mechanisms of the preferred embodiment, and the benefits and advantages of the present invention, are not limited by media type. Thus, the choice of a particular type of MPS must be made in accordance with the specific type of media that is to be used. For example, if the chosen media is audio, the chosen MPS must have general audio presentation capability. This capability could potentially include distribution to more than one speaker. If the chosen media is audio and video (i.e., multimedia), the chosen MPS must have both audio and video presentation capability. Therefore, as its name suggests, a Media Presentation Station is defined herein as a station for presenting media to a user.

Referring still to FIG. 1, the MDS of the preferred embodiment generally operates as follows. Server 100 determines the location of Handheld Device (HD) 125 through interaction with MPSs 105-120. Once the location is determined, Server 100 routes media to the MPS that most closely corresponds to the determined location. The user of HD 125 can also use HD 125 to select media and/or to control the presentation of selected media (e.g., volume, fidelity, etc.). When a user moves HD 125 from one location to another, MDS 100 of the preferred embodiment detects the movement and reroutes the media accordingly.

Figure 2:
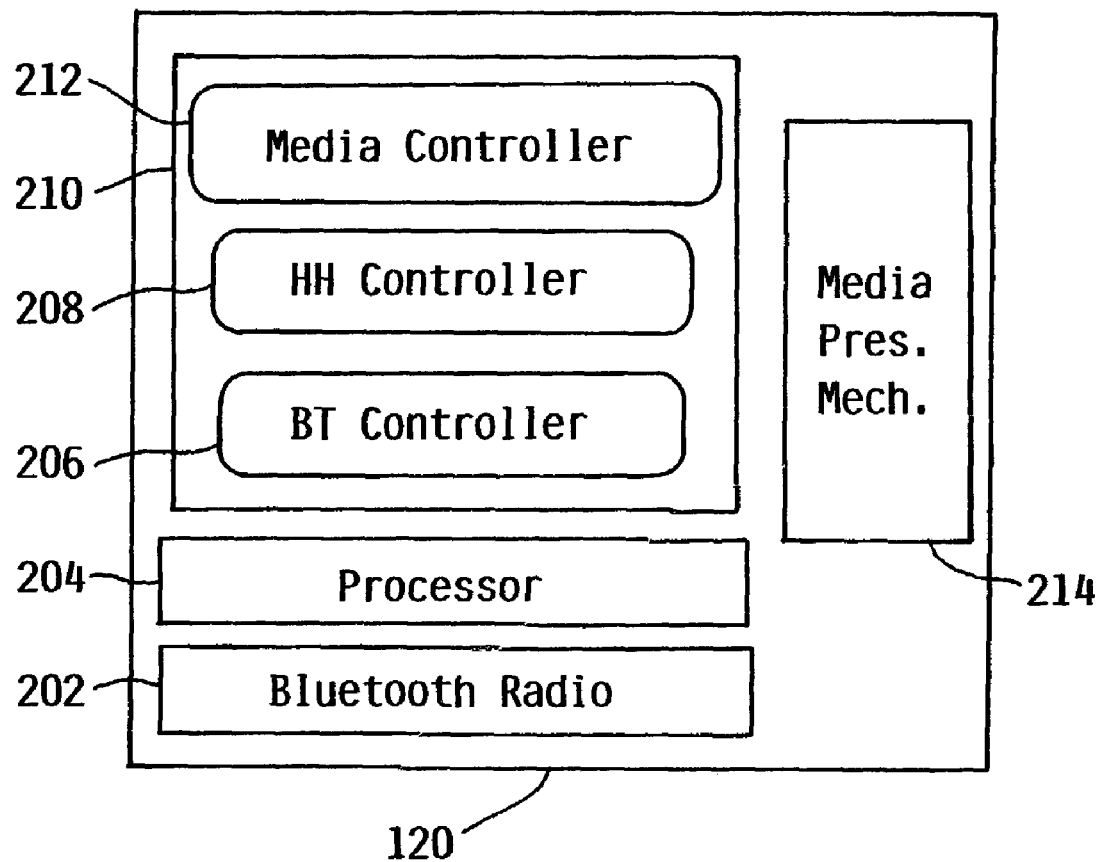
FIG. 2 is a block diagram showing some of the components used in the Media Presentation Stations of the preferred embodiment of the present invention.

FIG. 2 is a block diagram showing some of the components used in the Media Presentation Stations of the preferred embodiment. MPS 120, from FIG. 1, is used as an example. As shown, MPS 120 contains Bluetooth Radio 202, Processor 204, and Memory 210. Shown within Memory 210 are: Bluetooth Controller 206, Handheld Controller 208, and Media Controller 212. MPS 120 also contains Media Presentation Mechanism 214.

Bluetooth Radio 202 of the preferred embodiment is a Bluetooth Class 3 radio, which provides connectivity up to ten (10) meters. Processor 204 is any commercially available, small-scale processor capable of executing the programs disposed in Memory 210. Bluetooth Controller 206 provides a software interface to Bluetooth Radio 202 for the other controllers shown in Memory 210. Handheld Controller 208 is used in the preferred embodiment to control interaction with Handheld Device 125. Handheld Controller 208 is discussed in more detail in the text associated with FIG. 6A. Media Controller 212 is used in the preferred embodiment to receive media and media control information and to interact with Media Presentation Mechanism 214 to present the received media and/or control presentation of the received media. Media Controller 208 is discussed in more detail in the text associated with FIG. 6B.

Figure 3:
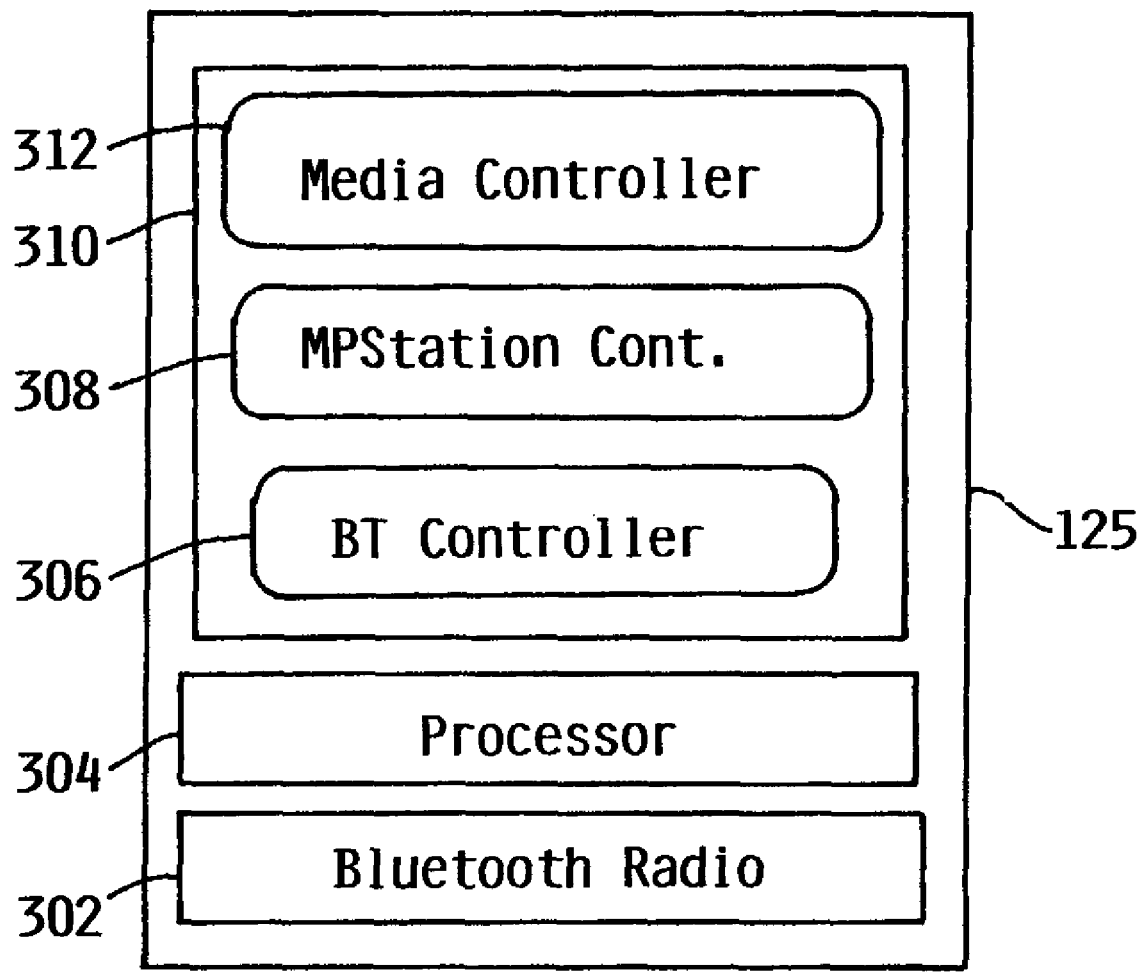
FIG. 3 is a block diagram showing some of the components used in the Handheld Device of the preferred embodiment of the present invention.

FIG. 3 is a block diagram showing some of the components used in the Handheld Device of the preferred embodiment of the present invention. As shown, HD 125 contains Bluetooth Radio 302, Processor 304, and Memory 310. Shown within Memory 310 are: Bluetooth Controller 306, MPS Controller 308, and Media Controller 312.

Figure 7A:
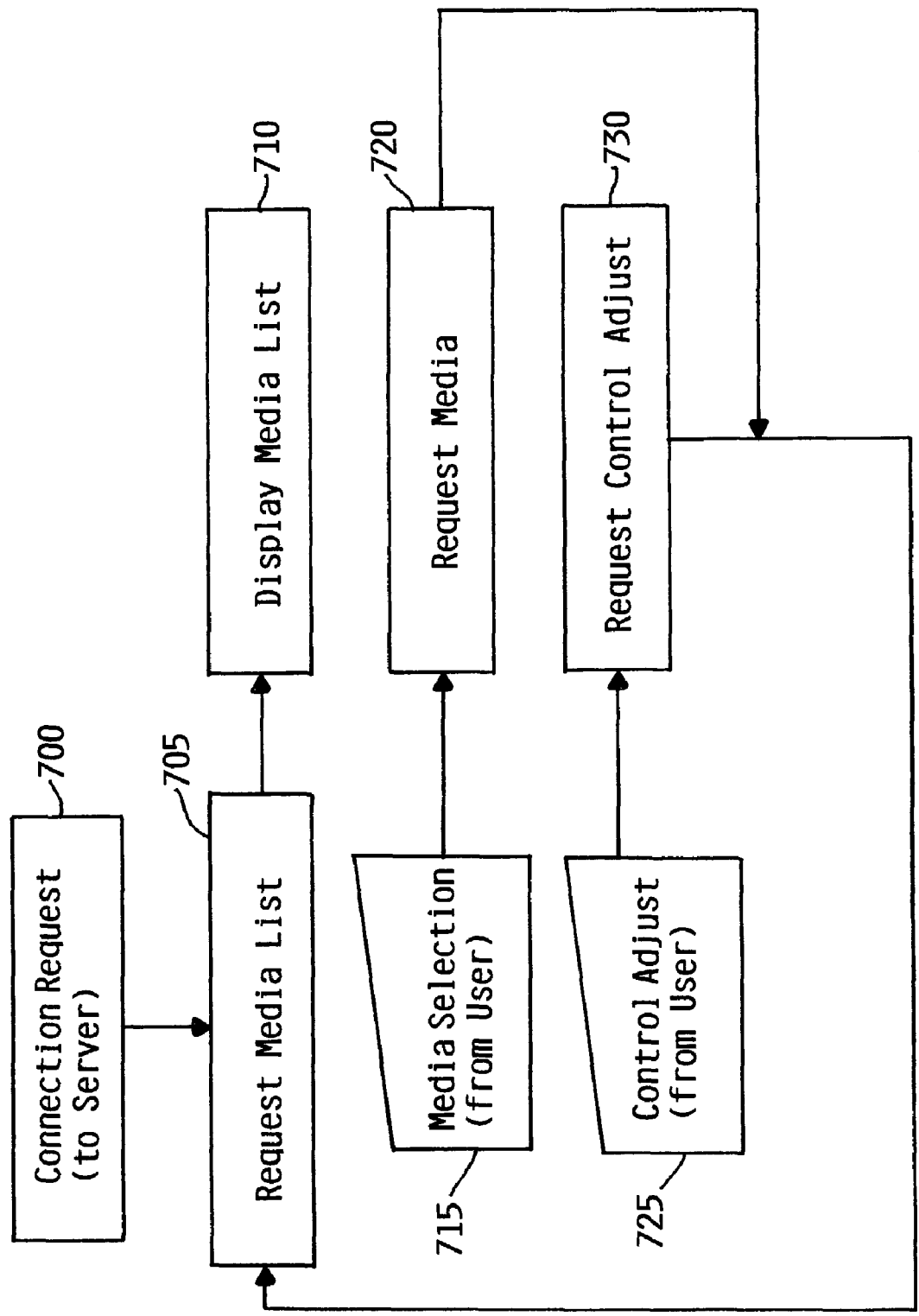
FIG. 7A is a flow diagram showing the steps used to carry out highlighted processing of a Media Controller that executes within the Handheld Device of the preferred embodiment of the present invention.
Figure 7B:
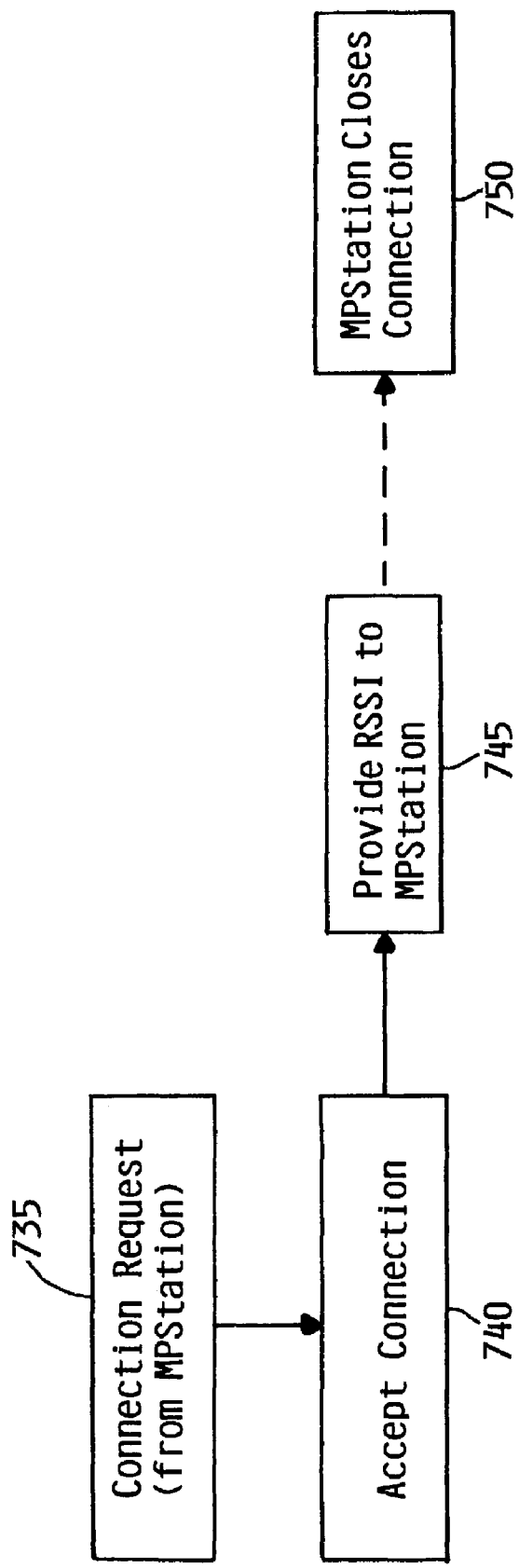
FIG. 7B is a flow diagram showing the steps used to carry out highlighted processing of a Media Presentation Station Controller that executes within the Handheld Device of the preferred embodiment of the present invention.

Bluetooth Radio 302, Processor 304, and Bluetooth Controller 306 are identical in substance and function to their above-described counterparts. Accordingly, the reader is asked to please refer to the discussion of MPS 120 for an explanation of these components. MPStation Controller 308, which is described in detail in the text associated with FIG. 7B, is responsible for handling the interaction between HD 125 and the MPStations of MDS 100. Media Controller 312, which is described in detail in the text associated with FIG. 7A, is responsible for interacting with the user and handling the user's requests appropriately.

Figure 4:
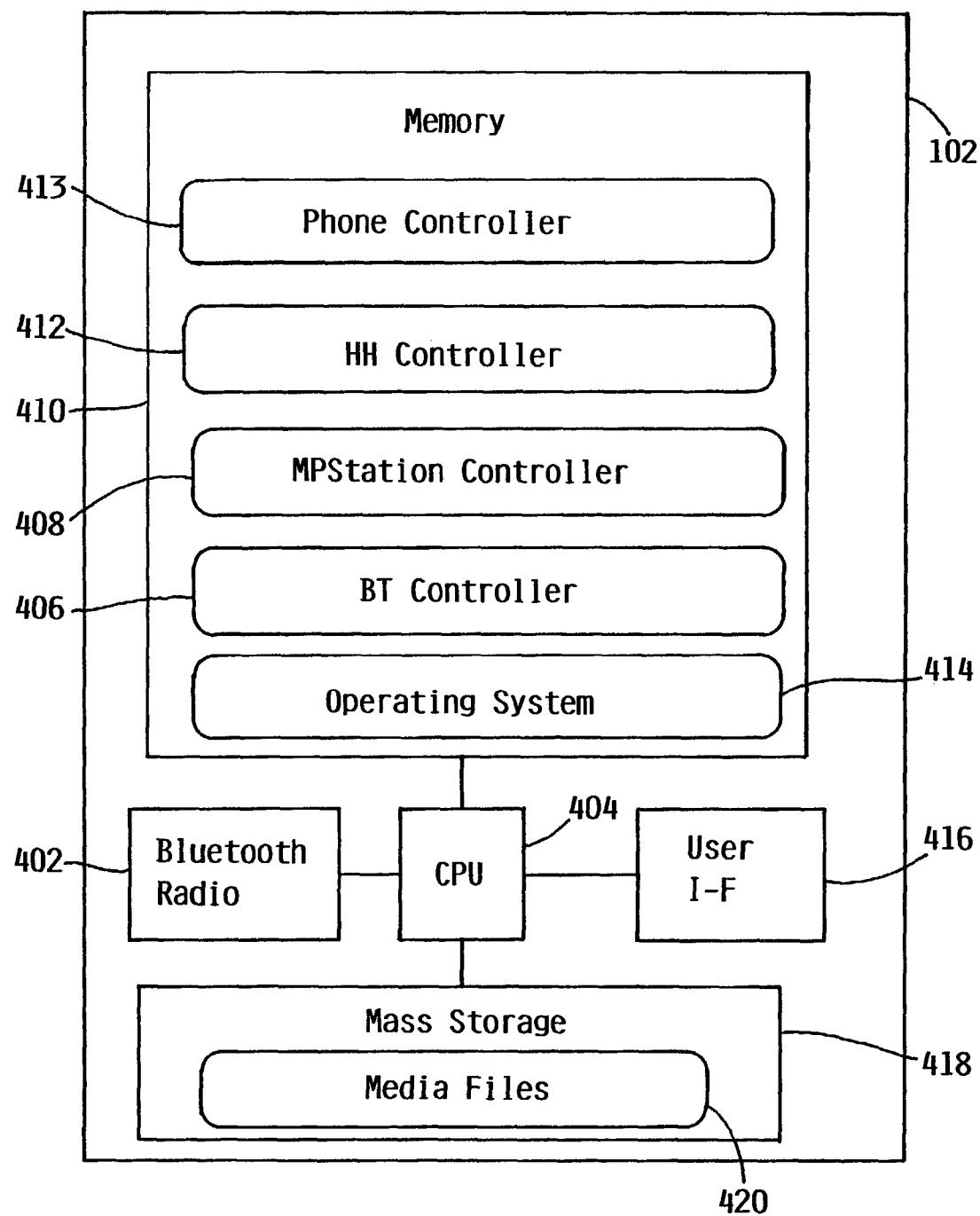
FIG. 4 is a block diagram showing some of the components used in the Server of the preferred embodiment of the present invention.

FIG. 4 is a block diagram showing some of the components used in Server 102 of the preferred embodiment of the present invention. Server 102 is an enhanced IBM iSeries computer system, although other computer systems could be used. Depicted components include Central Processing Unit (CPU) 404, Bluetooth Radio 402, User Interface 416, Mass Storage 420, and Memory 410. CPU 404 is used to execute the programs stored in Memory 410, although it should be understood that at certain times these programs may partially or completely reside in Mass Storage 420. As above, Bluetooth Radio 402 is a class 1 radio, which has a hundred meter range and is capable of communicating with other Bluetooth compatible devices. User interface 416 is used to accept commands and relay information to the one or more users of computer Server 102.

Figure 8A:
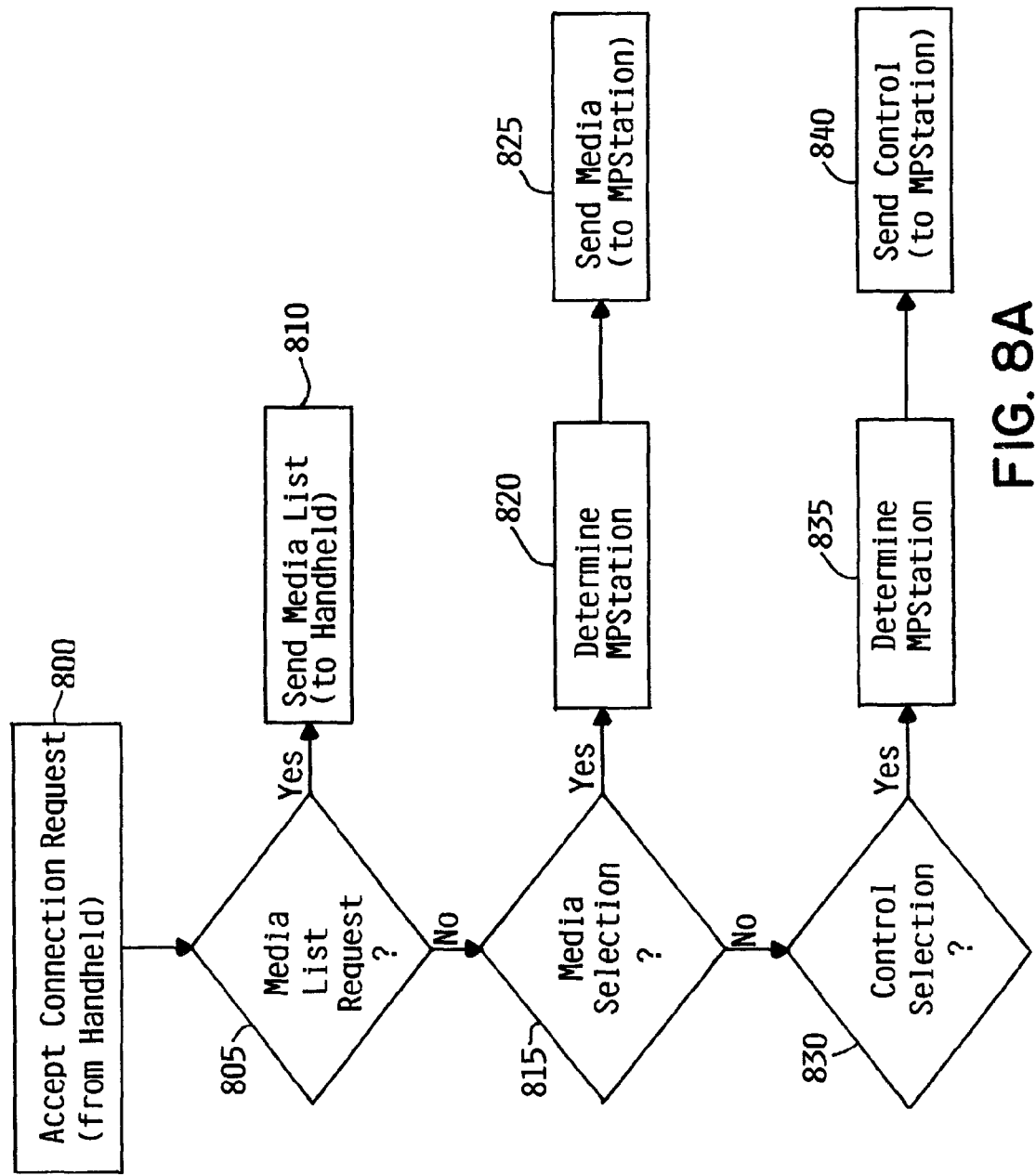
FIG. 8A is a flow diagram showing the steps used to carry out highlighted processing of a Handheld Controller that executes within the Server of the preferred embodiment of the present invention.
Figure 8B:
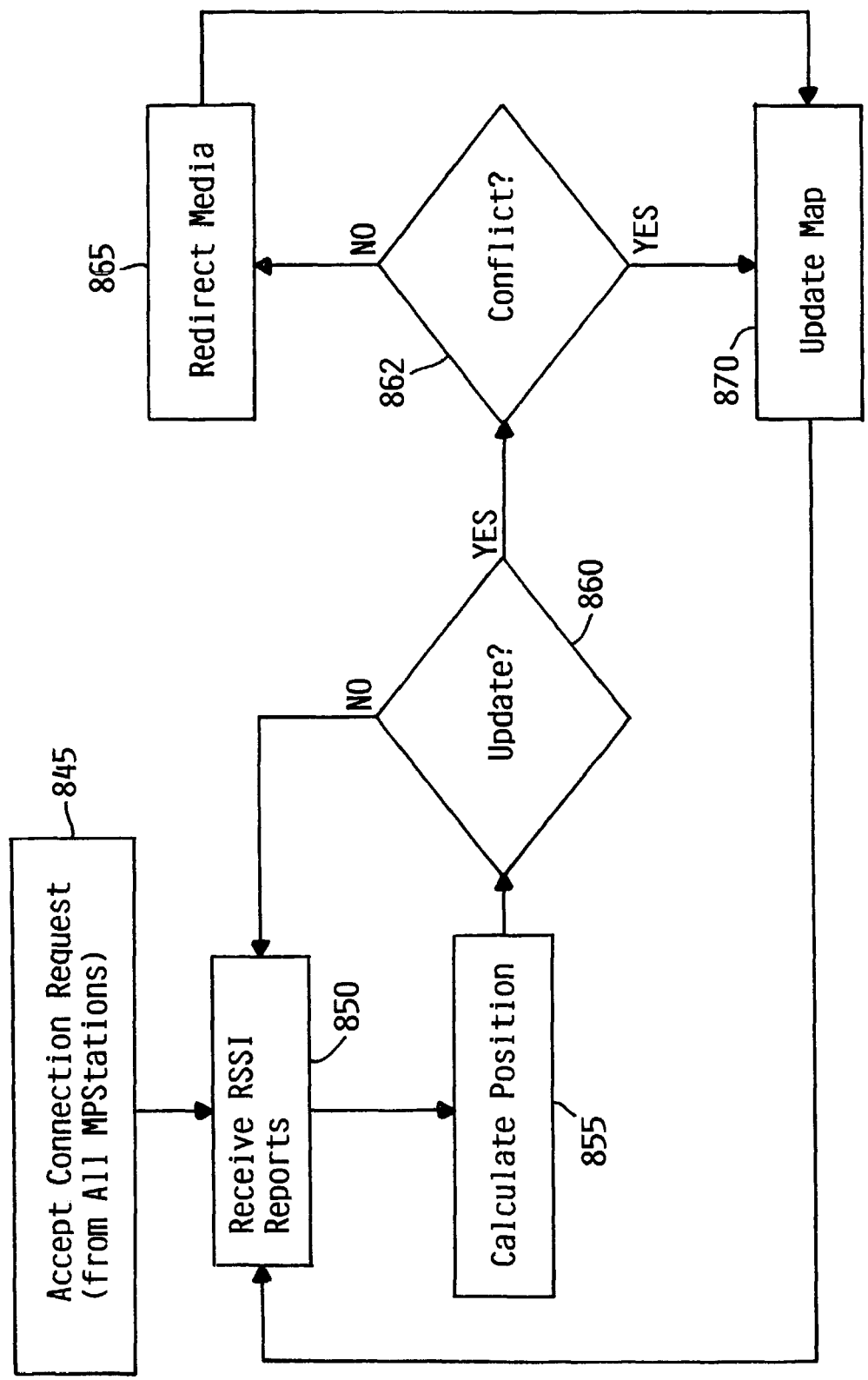
FIG. 8B is a flow diagram showing the steps used to carry out highlighted processing of a Media Presentation Station Controller that executes within the Server of the preferred embodiment of the present invention.
Figure 8C:
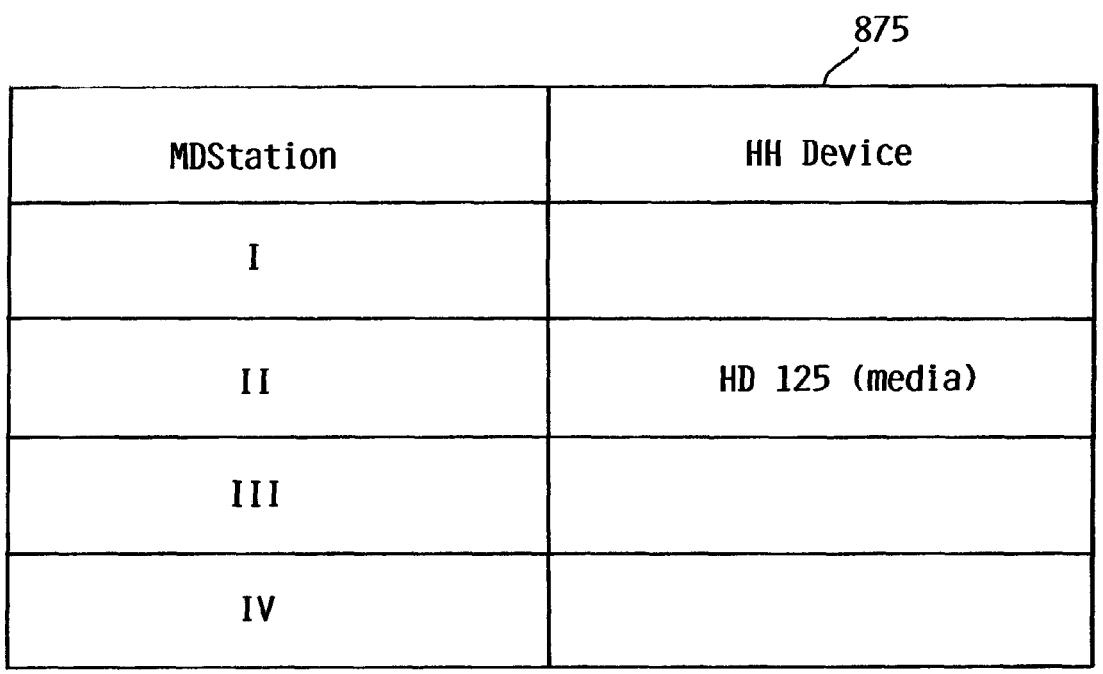
FIG. 8C is a diagram showing a map used in the preferred embodiment of the present invention to track the location of a Handheld Device relative to a Media Presentation Station.
Figure 8D:
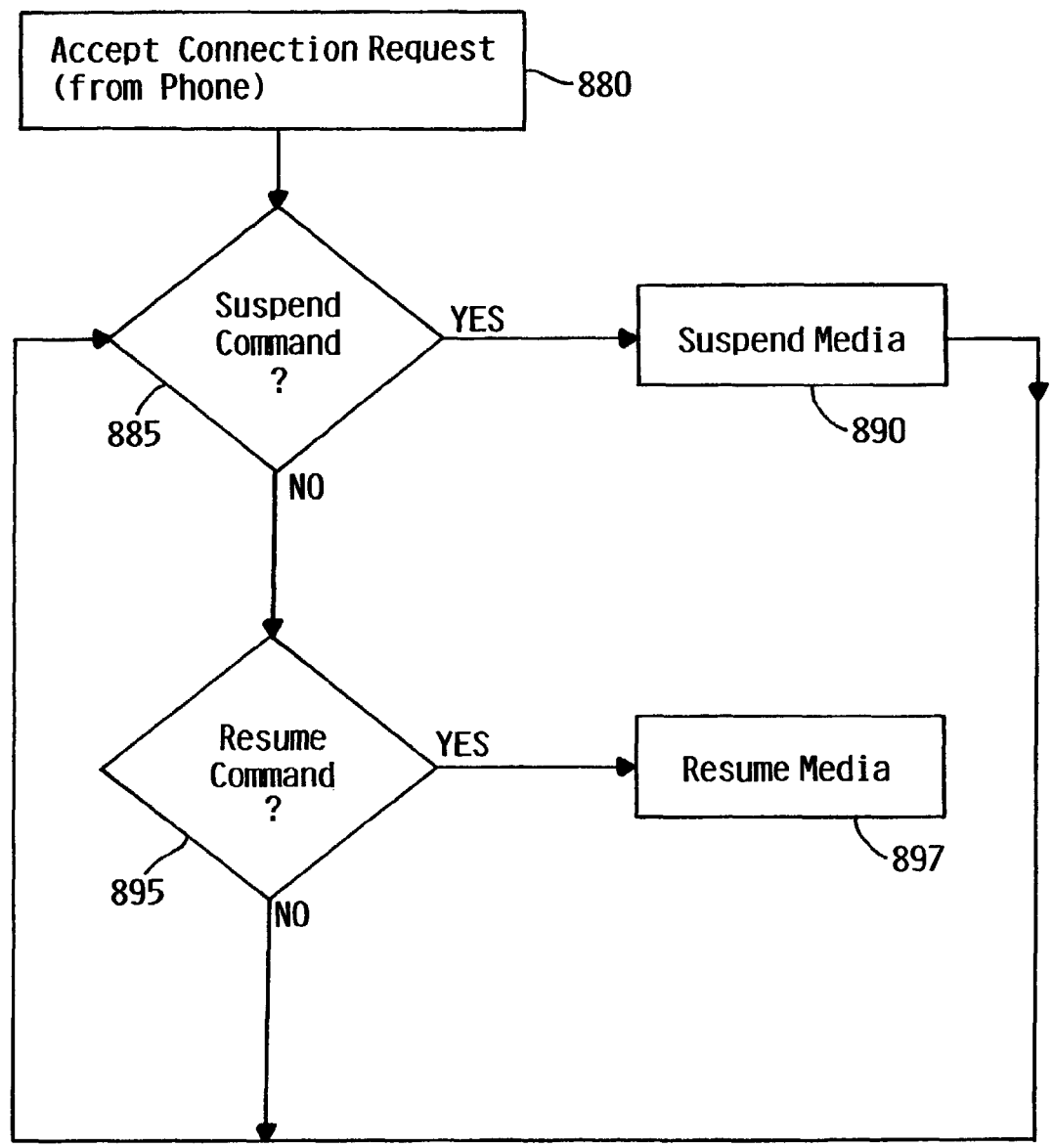
FIG. 8D is a flow diagram showing the steps used to carry out highlighted processing of a Phone Controller that executes within the Server of the preferred embodiment of the present invention.

Memory 410 contains Operating System 414, Bluetooth Controller 406. Media Presentation Station Controller 408, Handheld Controller 412, and Phone Controller 413. Operating System 414 of the preferred embodiment is the multitasking operating system known in the industry as OS/400. Bluetooth Controller is a software interface to Bluetooth Radio 402 for the other controllers shown in Memory 410. Media Presentation Station Controller 408, which is described in further detail in the text associated with FIGS. 8B and 8C, is responsible for interacting with the various Media Presentation Stations to determine the location of one or more handheld devices. Handheld Controller 412, which is described in the text associated with FIG. 8A, is responsible for interacting with the one or more handheld devices of MDS 100 to select and control media presentation. Phone Controller 413, which is further described in the text associated with FIG. 8D, is responsible for interacting with Phone 130 to control media presentation vis-à-vis incoming phone calls.

Figure 5:
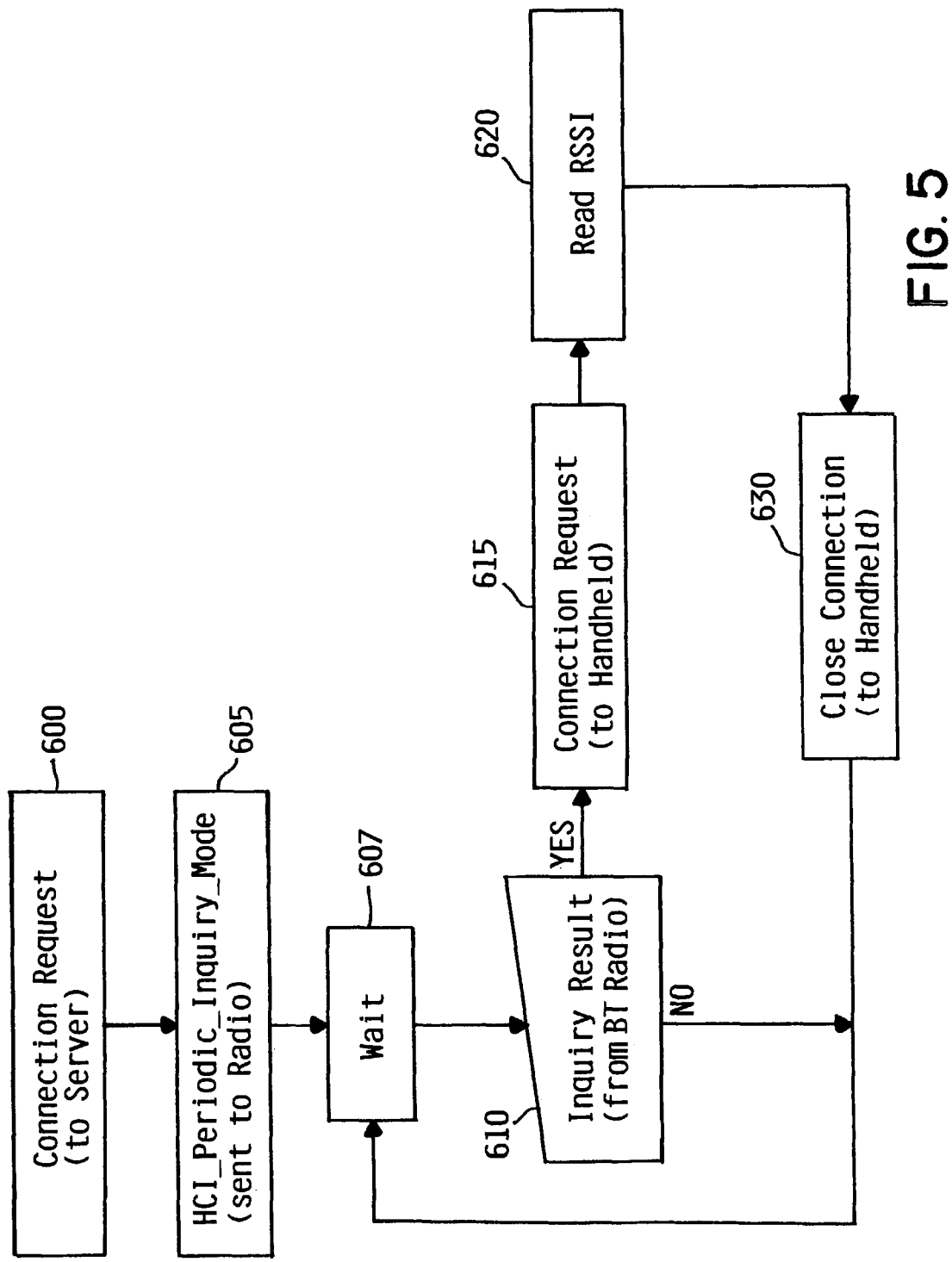
FIG. 5 is a block diagram showing some of the components used in the Phone of the preferred embodiment of the present invention.
Figure 9:
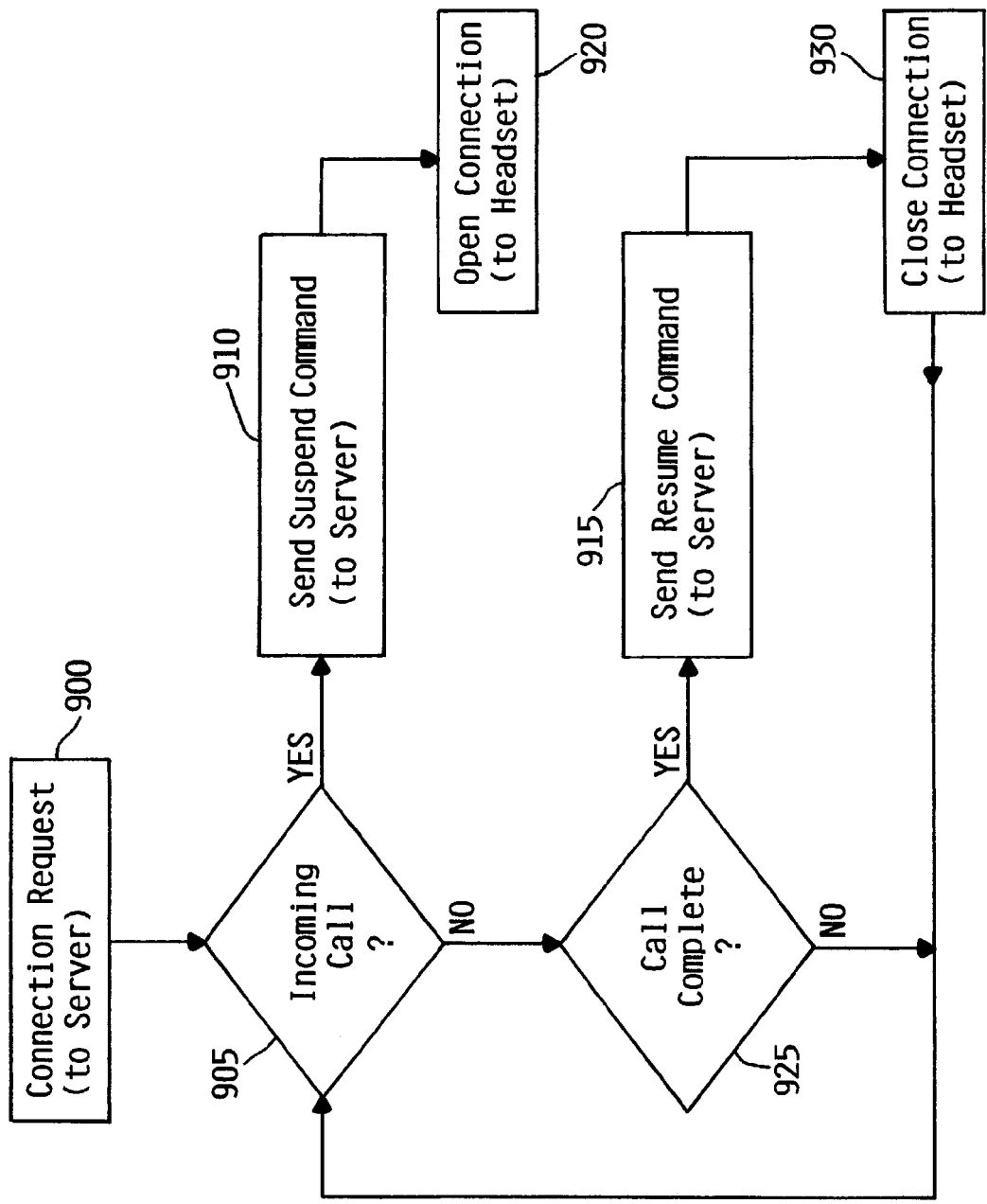
FIG. 9 is a flow diagram showing the steps used to carry out highlighted processing of a Server Controller that executes within the Phone of the preferred embodiment of the present invention.

FIG. 5 is a block diagram showing some of the components used in Phone 130 of the preferred embodiment. As shown, Phone 130 contains Bluetooth Radio 502, Processor 504, and Memory 510. Bluetooth Controller 506, Telephony Interface 508, and Server Controller 512 are shown to reside in Memory 510. As above, Bluetooth Radio 502 of the preferred embodiment is a Bluetooth Class 3 radio, which provides connectivity up to ten (10) meters. Processor 504 is any commercially available, small-scale processor capable of executing the programs disposed in Memory 510. Bluetooth Controller 506 provides a software interface to Bluetooth Radio 502 for the other program entities shown in Memory 510. Telephony Interface 508 is used to interact with an external telephone system, in the case of the preferred embodiment, a typical cell-based system. Server Controller 512, which is described in further detail in the text associated with FIG. 9, is responsible for interacting with Server 102 to control media presentation vis-à-vis incoming phone calls At this point, it is important to note that the preferred embodiment of the present invention is being described herein in the context of several discrete, yet complete systems. Nevertheless, it should be understood that the program mechanisms disclosed herein are capable of being distributed in program product form. Examples of such program mechanisms include the above-described controllers and groupings thereof. Of course, a program product can include more than one program mechanism and be distributed using different types of signal bearing media, including, but not limited to: recordable-type media such as floppy disks and CD ROMs and transmission-type media such as digital and analog communications links.

Processing Example

FIGS. 6A Through 9

The handheld devices of the preferred embodiment are used in combination with the other previously described components to route media and control its presentation. At a high level, the media presentation stations of the preferred embodiment detect the presence of one or more handheld devices. Information regarding the presence of a handheld device is then communicated from the media presentation stations to Server 102. Server 102 uses this information to maintain a record of the location of each handheld device. The recorded location information is used to route the media to the media presentation station that is closest to the location of the handheld device. Media information, such as media selection (i.e., which media item is to be presented) and media control (when appropriate), is forwarded from the handheld device to Server 102, so that Server 102 can take appropriate action relative to transmission of the media to the media presentation station at issue. If a phone call is received, phone 130 interacts with Server 102 to suspend presentation of the media. When the phone call ends, presentation is automatically resumed.

The following hypothetical processing example will now be used to describe the preferred embodiment function that is represented by the remaining Figures. Referring briefly to FIG. 1, the reader is asked to assume for the purposes of this explanation that Handheld Device (HD 125) is located in a position within the 10-meter range of the Bluetooth radio contained in Media Presentation Station II.

Media Routing

When power is applied to the media presentation stations of the preferred embodiment, they each initially request a connection to Server 102. This step is represented by block 600 of FIG. 6A.

Figure 6A:
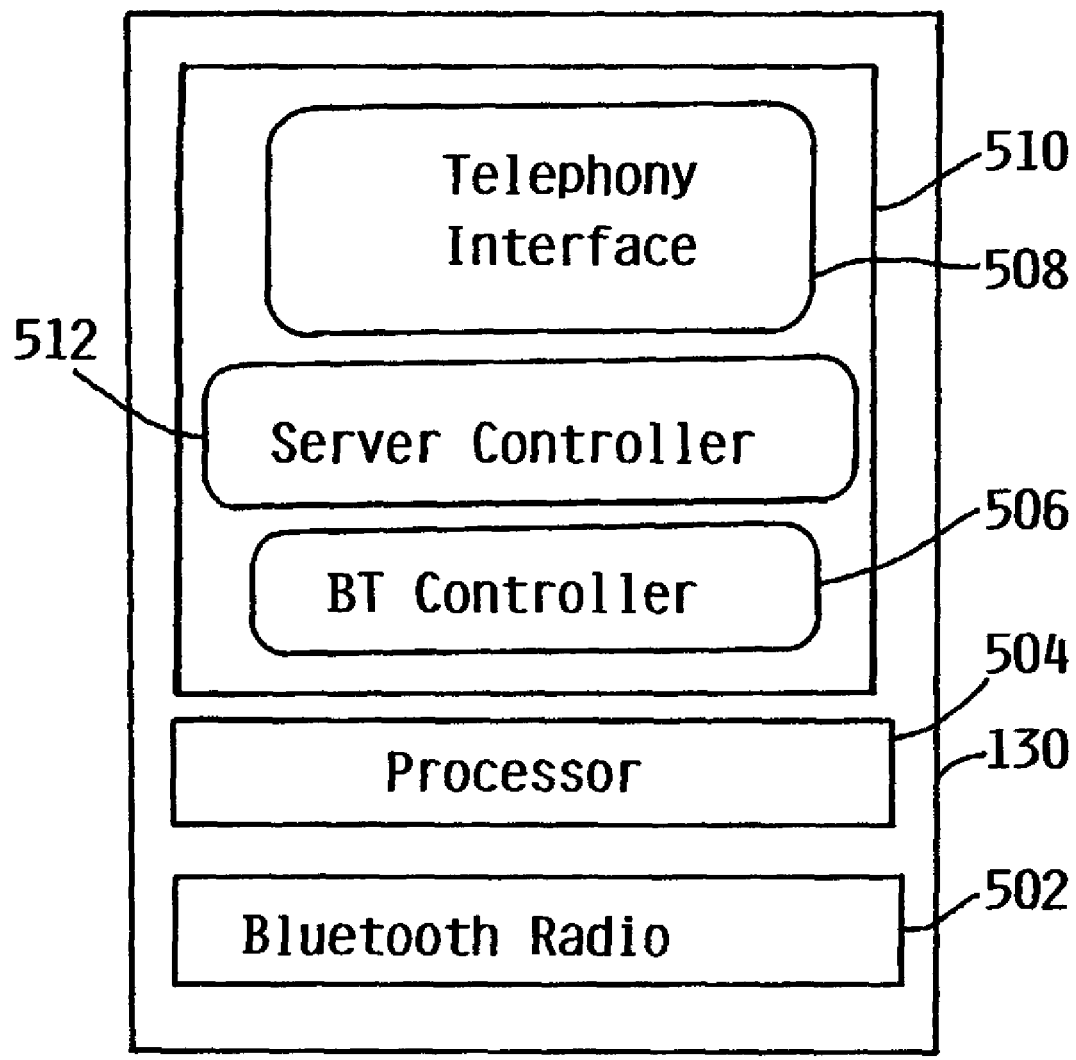
FIG. 6A is a flow diagram showing the steps used to carry out highlighted processing of a Handheld Controller that executes within the Media Presentation Stations of the preferred embodiment of the present invention.

As stated earlier, FIG. 6A is a flow diagram showing the steps used to carry out highlighted processing of the handheld controller of the media presentation stations of the preferred embodiment. After establishing a connection to Server 102, the media presentation stations set out to determine whether a handheld device (e.g., HD 125) is within range of their Bluetooth radios. Per the Bluetooth protocol, this is accomplished by issuing an HCI_Periodic_Inquiry_Mode command to their radios. Thus, Handheld Controller 208 issues an HCI_Periodic_Inquiry_Mode command to Bluetooth Radio 202 via Bluetooth Controller 206. Bluetooth Radio 202 responds to this command by repeatedly issuing Automatic Inquiry messages. Incorporated into the HCI_Periodic_Inquiry_Mode command is a delay period, which permits a break in transmission. This break in transmission is in place to avoid flooding an area with inquiry messages.

After sending the HCI_Periodic_Inquiry_Mode command, Handheld controller waits in block 607. Any Inquiry Response messages received by Bluetooth radio 202 are surfaced to Handheld controller 208 in the form of an Inquiry Result message. When Handheld Controller 208 receives an Inquiry Result message [block 610], Handheld Controller 208 proceeds to connect to the detected handheld device (i.e., HD 125) in block 615. Handheld Controller 208 then obtains the RSSI, which stands for Radio Signal Strength Indicator, from HD 125. Bluetooth radios can be optionally configured to measure their own receiver signal strength and report it as an RSSI value. The Bluetooth radios of the preferred embodiment are so configured. Receipt of the connection request by HD 125 is represented by block 735 of FIG. 7B. FIG. 7B is a flow diagram showing the steps used to carry out highlighted processing of a Media Presentation Station Controller 308 (see FIG. 3) of HD 125 of the preferred embodiment. After the connection is accepted in block 740, Media Presentation Station Controller 308 provides the RSSI to Media Presentation Station IV. Media Presentation Station IV then closes the connection [see block 750 of FIG. 7B and block 630 of FIG. 6A] and returns to its wait state in block 607. The dashed line on FIG. 7B is intended to show that the connection is closed by Media Presentation Station IV, not Media Presentation Station Controller 308.

RSSI information is received by MPStation Controller 408 of Server 102. This logic is shown on FIG. 8B. Connection requests from the media presentation stations are received in block 845. As discussed earlier (see block 600 of FIG. 6A), the media presentation stations connect to Server 102 at power-on and remain connected until they are powered down. These connections are used by Server 102 to obtain RSSI information from each media presentation station [block 850]. Using this information MPStation Controller 408 is able to calculate the position of each handheld device. In the preferred embodiment, triangulation with RSSI values is used to determine position, although other positioning methods could be used.

Once the position is calculated, MPStation Controller 408 uses the map shown on FIG. 8C to determine whether current media routing is correct given the calculated position. As shown, Map 875 of the preferred embodiment consists of a logical, two column, multi-row table. The rows individually correspond to specific media presentation stations. The two columns are used to correlate the location of a specific media presentation station with the current location of a handheld device. For example, as shown on FIG. 8C, Map 875 indicates that HD 125 is currently located in a position proximate to Media Presentation Station II. Per the example, though, HD 125 has moved from a location proximate to Media Presentation Station II to a location proximate to Media Presentation IV. If the current media routing had been correct, MPStation Controller 408 would simply return to consideration of the next RSSI information in block 850. Here, though, rerouting of the media is called for in that HD 125 has been moved to location proximate to a different media presentation station.

MPStation Controller 408 first determines whether the redirection called for by the movement of HD 125 will result in a conflict with the position of another handheld device [block 862]. Conflicts are handled on a first come, first served basis within the preferred embodiment. If a conflict were at issue, MPStation Controller 408 would create an additional entry in Map 875 (i.e., the HH Device column of the MDStation IV row) for HD 125, so that media routing could be adjusted after the conflicting handheld was moved from the area. However, the reader is asked to assume here that no such conflict exists. Accordingly, MDStation Controller 408 proceeds to redirect the media [block 865] before updating Map 875 to indicate that HD 125 is now located proximate to Media Presentation Station IV.

Media Control

Figure 6B:
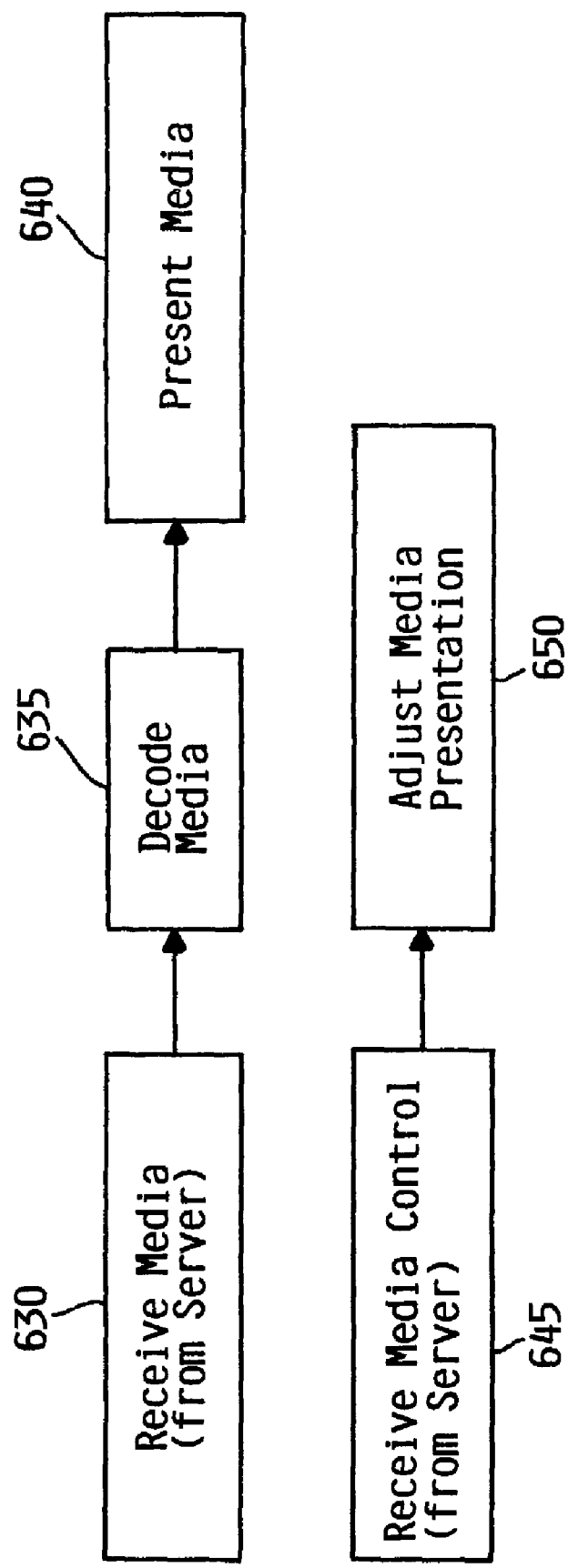
FIG. 6B is a flow diagram showing the steps used to carry out highlighted processing of a Media Controller that executes within the Media Presentation Stations of the preferred embodiment of the present invention.

The handheld devices of the preferred embodiment each interact with a user and Server 102 to make media selections and to control media presentation. FIGS. 6B, 7A and 8A will now be described. As stated, FIG. 7A is a flow diagram showing the steps used to carry out highlighted processing of Media Controller 312, which executes within the handheld devices of the preferred embodiment. Media Controller 312 is the entity on HD 125 that is responsible for handing interaction with the user and with Server 102. FIG. 8A is a flow diagram showing the steps used to carry out highlighted processing of Handheld Controller 412, which executes within Server 102 of the preferred embodiment.

Media Controller 312 will first request a connection to Server 102. This request is received and accepted by Handheld Controller 412 of Server 102. See block 800 of FIG. 8A. Media Controller 312 then requests a media play list in block 705. In the preferred embodiment a media play list is a list of media titles, each of which having sufficient descriptiveness to permit informed selection by the user. This request is handled by Handheld Controller 412 in blocks 805 and 810. When the media list is received by Media Controller 312, it is displayed to the user in block 710. The user is then able to select new media and or control the presentation of media already being presented. When the user selects new media [block 715], Media Controller 312 requests the media from Handheld Controller 312 via its connection to Server 102. This request is represented by block 720 of FIG. 7A.

At Server 102, the request is handled by blocks 815, 820, and 825. In block 820, Handheld Controller 312 determines which media presentation is to receive the media. This is accomplished through reference to Map 875 of FIG. 8D. The media is then transmitted to the appropriate media presentation station in block 825 of FIG. 8A. The media is received by Media Controller 212 (see FIG. 2). This receipt is represented by block 630 of FIG. 6B. Where appropriate, the media will then be decoded [block 635] before presentation in block 640. It should be noted that decoding and presentation are media dependent considerations; and as is well understood by those skilled in the art, the benefits and advantages of the present invention, as taught by the preferred embodiment, are not dependent upon these considerations. Therefore, these non-critical implementation details are not proved herein.

Returning to FIG. 7A, the user can also choose to adjust how the media is currently being presented. This is, again, a media specific issue. However, examples could include volume control, tone control, tracking control (e.g., tracking/pause/skip/seek/play etc.), and picture control (e.g., tint, contrast, sharpness, etc.). At Server 102, the control request is handled by blocks 830, 835, and 840. In block 835, MPStation Controller 408 determines which media presentation station is to receive the media. As indicated above, this determination is made through reference to Map 875 of FIG. 8D. The control is then transmitted to the appropriate media presentation station in block 840 of FIG. 8A. The control is received by Media Controller 212 (see FIG. 2). This receipt is represented by block 645 of FIG. 6B. The presentation of the media is then adjusted in block 650.

Another feature of the present invention, as taught by the preferred embodiment, is automatic suspension/resumption of media presentation for phone call handling. This aspect of the preferred embodiment is described herein through reference to FIGS. 9 and 8D. When Bluetooth capable Phone 130 is powered on, it initiates a connection to Server 102. The connection initiation is represented by block 900 of FIG. 9 and its acceptance is represented by block 880 of FIG. 8D. Then, when Phone 130 receives an incoming call [block 905], it responds by sending a suspend command to Server 102. Phone 130 then opens a connection to headset 135 [block 920] so that the user can accept the phone call.

Phone Controller 413 of Server 102 identifies this command in block 885 and suspends transmission of the media in block 890. In the preferred embodiment, all media presentation is suspended regardless of its association with a handheld (i.e., regardless of its routing). It should be noted, though, that where more than one handheld device is being used, selective suspension could be accomplished by determining the location of Phone 130 relative to Media Presentation Stations I-IV.

When Phone 130 determines that the phone call has completed [block 925], Phone 130 sends a resume command to Phone Controller 413 of Server 102 before closing the connection to headset 135 in block 930. This command is identified in block 895 of FIG. 8D. Phone Controller 413 then proceeds to resume media presentation in block 897.

The embodiments and examples set forth herein were presented in order to best explain the present invention and its practical application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed. Many modifications and variations are possible in light of the above teaching without departing from the spirit and scope of the following claims. For example, one alternative would be elimination of a separate handheld device through migration of handheld function to that of the Bluetooth capable phone.

What is claimed is:

1. An apparatus for routing media, said apparatus comprising: a handheld device, said handheld device comprising an interface communicating with a user to obtain media information; a plurality of media presentation stations separate from said handheld device, each said media presentation station having a respective location and being capable of presenting media content to said user, said plurality of media presentation stations communicating via a wireless protocol with said handheld device to determine a first location of said handheld device; and a server, said server communicating via a wireless protocol with said plurality of media presentation stations to obtain said first location of said handheld device, said server communicating via a wireless protocol with said handheld device to determine said media information, said server using said first location of said handheld device to select a first media presentation station from among said plurality of media presentation stations for presenting media content to said user, said server routing said media content to said first media presentation station responsive to using said first location of said handheld device to select said first media presentation station from among said plurality of media presentation stations; wherein said first media presentation station, responsive to said server routing said media content to said first media presentation station, presents said media content to said user.

2. The apparatus of claim 1 wherein said plurality of media presentation stations communicate with said handheld device to determine a second location of said handheld device, said second location of said handheld device being different from said first location of said handheld device, and wherein said server uses said second location to reroute said media to a second presentation station different from said first presentation station.

3. The apparatus of claim 1 wherein said media information comprises media content selection information.

4. The apparatus of claim 1 wherein said media information comprises media control information and wherein said server uses said media control information to control presentation of said media content by said first media presentation station.

5. The apparatus of claim 4 wherein said media control information is selected from the group consisting of: volume control; tone control; tracking control; and picture control.

6. The apparatus of claim 1 further including a phone for receiving phone calls, said phone interacting with said server to suspend media content presentation to said user during each said phone call and to automatically resume media content presentation to said user after each said phone call has ended.

7. An apparatus for routing media, said apparatus comprising: a server, said server communicating via a wireless protocol with at least one media presentation station of a plurality of media presentations, each said media presentation station having a respective location and being capable of presenting media content to a user, to obtain a first location of a handheld device, said handheld device being separate from said plurality of media presentation stations, said server communicating via a wireless protocol with said handheld device to determine media information, said server using said first location of said handheld device to select a first media presentation station from among said plurality of media presentation stations for presenting media content to said user, said server routing said media content to said first media presentation station for presentation to said user responsive to using said first location of said handheld device to select said first media presentation station from among said plurality of media presentation stations.

8. The apparatus of claim 7 wherein said server communicates with said at least one media presentation station to determine a second position of said handheld device, said second location of said handheld device being different from said first location of said handheld device, and wherein said server uses said second location to reroute said media content to a second presentation station different from said first media presentation station for presentation to said user, said second media presentation station being one of said plurality of media presentation stations.

9. The apparatus of claim 7 wherein said media information comprises media content selection information.

10. The apparatus of claim 7 wherein said media information comprises media control information and wherein said server uses said media control information to control presentation of said media content by said first media presentation station.

11. The apparatus of claim 10 wherein said media control information is selected from the group consisting of: volume control; tone control; tracking control; and picture control.

12. The apparatus of claim 7 further including a phone for receiving phone calls, said phone interacting with said server to suspend media content presentation to said user during each said phone call and to automatically resume media content presentation to said user after each said phone call has ended.

13. A program product for routing media, said program product comprising: non-transitory computer readable media; and a first program mechanism disposed on said non-transitory computer readable media, said first program mechanism comprising an interface communicating with a user to obtain media information; a second program mechanism disposed on said non-transitory computer readable media, said second program mechanism communicating via a wireless protocol with a handheld device to determine a first location of said handheld device; and a third program mechanism disposed on said non-transitory computer readable media, said third program mechanism communicating via a wireless protocol with a plurality of media presentation stations separate from said handheld device to obtain said first location of said handheld device, each said media presentation station having a respective location and being capable of presenting media content to said user, said third program mechanism communicating via a wireless protocol with said handheld device to determine media information, said third program mechanism using said first location of said handheld device to select a first media presentation station from among said plurality of media presentation stations for presenting media content to said user, said third program mechanism routing said media content to said first media presentation station responsive to using said first location of said handheld device to select said first media presentation station from among said plurality of media presentation stations; wherein said first media presentation station, responsive to said third program mechanism routing said media content to said first media presentation station, presents said media content to said user.

14. The program product of claim 13 wherein said second program mechanism communicates with said handheld device to determine a second location of said handheld device, said second location of said handheld device being different from said first location of said handheld device, and wherein said third program mechanism uses said second location to reroute said media content to a second presentation station different from said first media presentation station for presentation to said user.

15. The program product of claim 13 wherein said media information comprises media content selection information.

16. The program product of claim 13 wherein said media information comprises media control information and wherein said third program mechanism uses said media control information to control presentation of said media content by said first media presentation station.

17. The program product of claim 16 wherein said media control information is selected from the group consisting of: volume control; tone control; tracking control; and picture control.

18. The program product of claim 13 further including a fourth program mechanism disposed on said non-transitory computer readable media, said fourth program mechanism interacting with said third program mechanism to suspend media content presentation to said user during each of at least one phone call and to automatically resume media content presentation to said user after each said at least one phone call has ended.

19. A program product for routing media, said program product comprising: non-transitory computer readable media; and a program mechanism disposed on said non-transitory computer readable media, said program mechanism communicating via a wireless protocol with at least one media presentation station of a plurality of media presentations, each said media presentation station having a respective location and being capable of presenting media content to a user, to obtain a first location of a handheld device, said handheld device being separate from said plurality of media presentation stations, said program mechanism using said first location of said handheld device to select a first media presentation station from among said plurality of media presentation stations for presenting media content to said user, said program mechanism causing said media content to be presented at said first media presentation station and not at other media presentation stations of said plurality of media presentation stations responsive to using said first location of said handheld device to select said first media presentation station from among said plurality of media presentation stations.

20. The program product of claim 19 wherein said wherein said program mechanism communicates with said at least one media presentation station to determine a second location of said handheld device, said second location of said handheld device being different from said first location of said handheld device, and wherein said program mechanism uses said second location to select a second media presentation station different from said first media presentation station for presentation to said user, said second media presentation station being one of said plurality of media presentation stations, and thereafter causes said media content to be presented at said second media presentation station and not at said first media presentation station.

21. The program product of claim 19 wherein said program mechanism further communicates via a wireless protocol with said handheld device to determine media information, said media information comprising media content selection information.

22. The program product of claim 19 wherein said program mechanism further communicates via a wireless protocol with said handheld device to determine media information, said media information comprising media control information and wherein said program mechanism uses said media control information to control presentation of said media content by said first media presentation station.

23. The program product of claim 22 wherein said media control information is selected from the group consisting of: volume control; tone control; tracking control; and picture control.

24. The program product of claim 19 further including a second program mechanism disposed on said non-transitory computer readable media, said second program mechanism interacting with said first program mechanism to suspend media content presentation to said user during each of at least one phone call and to automatically resume media content presentation to said user after each said at least one phone call has ended.

25. A method for routing media, said method comprising the computer-executed steps of: providing an interface communicating with a user to obtain media information; communicating via a wireless protocol with a handheld device to determine a first location of said handheld device; and selecting a first media presentation station from among a plurality of media presentation stations for presenting media content to said user, each said media presentation station having a respective location and being capable of presenting media content to said user and being separate from said handheld device, said first media presentation station being selected based upon said first location of said handheld device; and responsive to selecting a first media presentation station, presenting media content at said first media presentation station and not at other media presentation stations of said plurality of media presentation stations.

26. The method of claim 25 further comprising the computer-executed steps of: communicating with said handheld device to determine a second location of said handheld device, said second location of said handheld device being different from said first location of said handheld device, and rerouting said media to a second presentation station different from said first media presentation station based on said second location of said handheld device responsive to determining a second location of said handheld device, selecting a second presentation station different from said first media presentation station based on said second location of said handheld device, and thereafter presenting said media content at said second media presentation station and not at said first media presentation station.

27. The method of claim 25 wherein said media information comprises media content selection information.

28. The method of claim 25 wherein said media information comprises media control information and wherein said media control information is used to control presentation of said media content by said first media presentation station.

29. The method of claim 28 wherein said media control information is selected from the group consisting of: volume control; tone control; tracking control; and picture control.

30. The method of claim 25 further including the computer-executed steps of: suspending media content presentation to said user during a phone call; and automatically resuming media content presentation to said user after said phone call has ended.

31. A method for presenting media content to a user, said method comprising the computer-executed steps of: communicating via a wireless protocol with at least one media presentation station of a plurality of media presentation stations to obtain a location of a handheld device associated with a user and separate from each said media presentation station, each media presentation station of said plurality of media presentation stations having a respective location and being capable of presenting media content to said user; selecting a first media presentation station from among said plurality of media presentation stations for presenting media content to said user, said first media presentation station being selected based upon said first location of said handheld device; and responsive to selecting a first media presentation station, presenting media content at said first media presentation station and not at other media presentation stations of said plurality of media presentation stations.

32. The method of claim 31 further comprising the computer-executed steps of: communicating with said at least one media presentation station to determine a second position location of said handheld device, said second location of said handheld device being different from said first location of said handheld device, and responsive to determining a second location of said handheld device, selecting a second presentation station different from said first media presentation station based on said second location of said handheld device, said second media presentation station being one of said plurality of media presentation stations, and thereafter presenting said media content at said second media presentation station and not at said first media presentation station.

33. The method of claim 31, further comprising: communicating via a wireless protocol with said handheld device to determine media information, wherein said media information comprises media content selection information.

34. The method of claim 31, further comprising: communicating via a wireless protocol with said handheld device to determine media information, wherein said media information comprises media control information that is used to control presentation of said media content by said first media presentation station.

35. The method of claim 34 wherein said media control information is selected from the group consisting of: volume control; tone control; tracking control; and picture control.

36. The method of claim 31 further comprising the computer-executed steps of: suspending media content presentation to said user during a phone call; and automatically resuming media content presentation to said user after said phone call has ended.

* * * * *